(12) United States Patent
Kojima et al.

(10) Patent No.: US 7,178,564 B2
(45) Date of Patent: Feb. 20, 2007

(54) SUPPLYING/REMOVING APPARATUS OF PUNCTURE SEALANT OF TIRE

(75) Inventors: Yoshihide Kojima, Kobe (JP); Yasuhiro Kubota, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 71 days.

(21) Appl. No.: 11/146,009

(22) Filed: Jun. 7, 2005

(65) Prior Publication Data

US 2005/0284536 A1    Dec. 29, 2005

(30) Foreign Application Priority Data

Jun. 28, 2004    (JP)    ............... 2004-190045

(51) Int. Cl.
*B65B 31/00*    (2006.01)

(52) U.S. Cl. ............... 141/38; 141/65; 141/67; 141/100; 141/114; 152/415

(58) Field of Classification Search ............... 141/9, 141/37, 38, 65, 67, 98, 100, 105, 114; 137/597, 137/607; 152/415
See application file for complete search history.

(56) References Cited

U.S. PATENT DOCUMENTS 4,765,367 A  *  8/1988  Scott ............... 137/607

6,019,145 A  *  2/2000  Savidge ............... 141/38

FOREIGN PATENT DOCUMENTS

| EP | 1174251 A | 1/2002 |
|---|---|---|
| EP | 1419876 A | 5/2004 |
| JP | 10-67212 A | 3/1998 |
| JP | 11254923 A | 9/1999 |
| JP | 2000-108215 A | 4/2000 |
| JP | 2003-127242 A | 5/2003 |
| JP | 2004-114524 A | 4/2004 |

* cited by examiner

*Primary Examiner*—Timothy L. Maust
(74) *Attorney, Agent, or Firm*—Birch, Stewart, Kolasch & Birch, LLP

(57) ABSTRACT

A puncture sealant supplying/removing apparatus includes a pressure-resistant bottle, an apparatus body on which the pressure-resistant bottle can be mounted, supply hose means which supplies or returns a puncture sealant accommodated in the pressure-resistant bottle to or from a tire, and a high pressure air source.

The apparatus body comprises a venturi flow-path having a venturi portion, a first flow-path extending from the venturi portion into the pressure-resistant bottle, and a second flow-path extending from an inside of the pressure-resistant bottle and connected to one end of the supply hose means. The venturi flow-path is provided at its one end with an air intake which is connected to the high pressure air source, the venturi flow-path is provided at its other end with an opening/closing tool capable of opening and closing the other end.

11 Claims, 6 Drawing Sheets

SUPPLYING/REMOVING APPARATUS OF PUNCTURE SEALANT OF TIRE

BACKGROUND OF THE INVENTION

1. Field of the Invention

The present invention relates to a supplying/removing apparatus of puncture sealant of a tire capable of charging the puncture sealant into a punctured tire and removing the puncture sealant charged in the tire.

2. Description of the Related Art

As such an apparatus, Japanese Patent Applications Laid-open No. 2003-127242 and No. 2004-114524 propose structures as shown in FIGS. 6(A) and (B). In this apparatus (a), an easily deformable plastic container (b) is used, the container (b) is manually compressed (pressed), thereby charging the puncture sealant into a tire (T) (FIG. 6(A)). Thereafter, the container (b) is taken out, a compressor is connected to the tire (T) to pump up the tire (T) and then, the tire (T) is allowed to run, and the puncture hole is sealed by the puncture sealant in a first-aid manner. This method is called a manual system in some cases.

The tire (T) which was repaired in the first-aid manner is carried to a tire-repairing place such as a garage at an appropriate time, and the tire (T) is replaced by a new tire. At that time, it is necessary to remove the puncture sealant from the tire (T). For this purpose, as shown in FIG. 6(B), the apparatus (a) used when the puncture sealant is charged is again used. More specifically, a hose (C) of the apparatus (a) is inserted into the tire from a valve mounting hole (T1) from which an air valve is removed, the container (b) is repeatedly compressed and restored manually, and the puncture sealant can be collected into the container (b) by a suction force generated at that time.

As another first-aid repairing method of the puncture, in addition to the manual system, there is a so-called automatic system in which a tire and a compressor are connected to a metal pressure-resistant container using a hose. According to this method, as disclosed in Japanese Patent Application Laid-open No. 2000-108215, a puncture sealant in a pressure-resistant container can be sent into the tire by supplying high pressure air from the compressor into the pressure-resistant container. Then, by successively allowing the high pressure air to flow, the tire can automatically pumped up.

According to the automatic system, however, since the pressure-resistant container having high strength is used, it is difficult to repeatedly compress and restore the container unlike the manual system. Thus, the automatic system has a problem that a suction apparatus for removing sealant is required separately.

SUMMARY OF THE INVENTION

The present invention basically uses, as an air flow-path, a venturi flow-path having a venturi portion at which its diameter is reduced. Based on this structure, it is an object of the invention to provide an economical supplying/removing apparatus of a puncture sealant of a tire capable of switching between a charging operation and a removing operation of a puncture sealant with a single motion, in which the apparatus cost is not increased, the apparatus structure is not complicated, the apparatus can be used easily, and a suction apparatus exclusively used therefor is not required.

To achieve the above object, the invention described in claim 1 of this application is characterized in that the puncture sealant supplying/removing apparatus comprises a pressure-resistant bottle capable of accommodating the puncture sealant, an apparatus body capable of mounting the pressure-resistant bottle, supply hose means which supplies the puncture sealant accommodated in the pressure-resistant bottle to the tire or which returns the puncture sealant in the tire into the pressure-resistant bottle, and a high pressure air source, wherein the apparatus body comprises a venturi flow-path having a venturi portion whose flow-path diameter is reduced, a first flow-path extending from the venturi portion into the pressure-resistant bottle mounted on the apparatus body, and a second flow-path extending from an inside of the pressure-resistant bottle, the second flow-path being in communication with the first flow-path in the pressure-resistant bottle and one end of the supply hose means being connected to the second flow-path, the venturi flow-path is provided at its one end with an air intake which can be connected to the high pressure air source, the venturi flow-path is provided at its other end with an opening/closing tool capable of opening and closing the other end.

Since the present invention has the above-described structure, it is possible to exhibit both a charging function and a removing function of the puncture sealant in an automatic system without increasing the cost of the apparatus or complicating the structure of the apparatus, and added value is enhanced, and usability can be enhanced. A special-purpose sucking apparatus is unnecessary, and the invention can greatly contribute economically.

DETAILED DESCRIPTION OF THE PREFERRED EMBODIMENTS

An embodiment of the present invention will be explained below together with illustrated examples.

Figure 1:
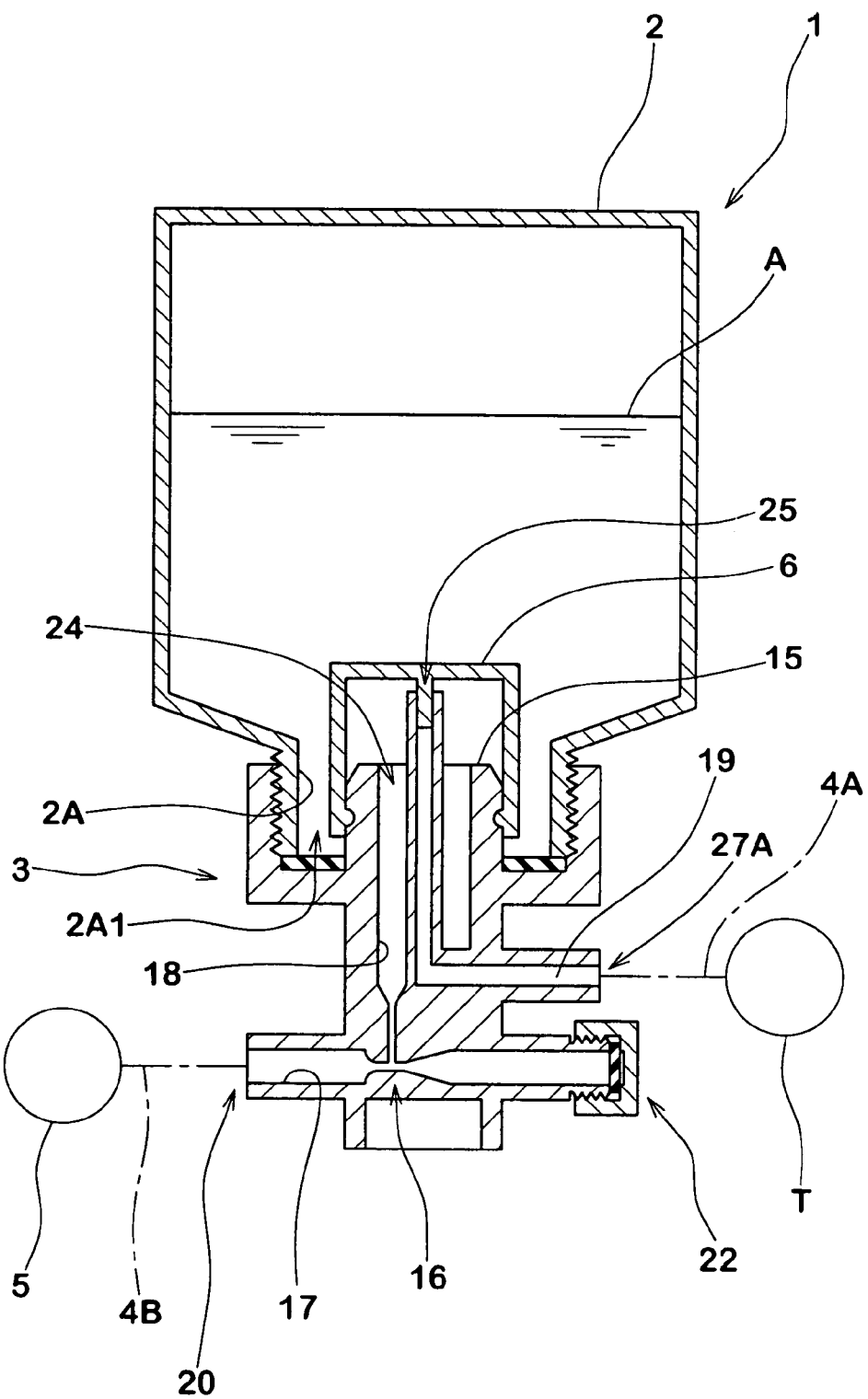
FIG. 1 is a sectional view showing one example of a state in which a puncture sealant supplying/removing apparatus of the present invention is used for first-aid repairing operation of a puncture.
Figure 2:
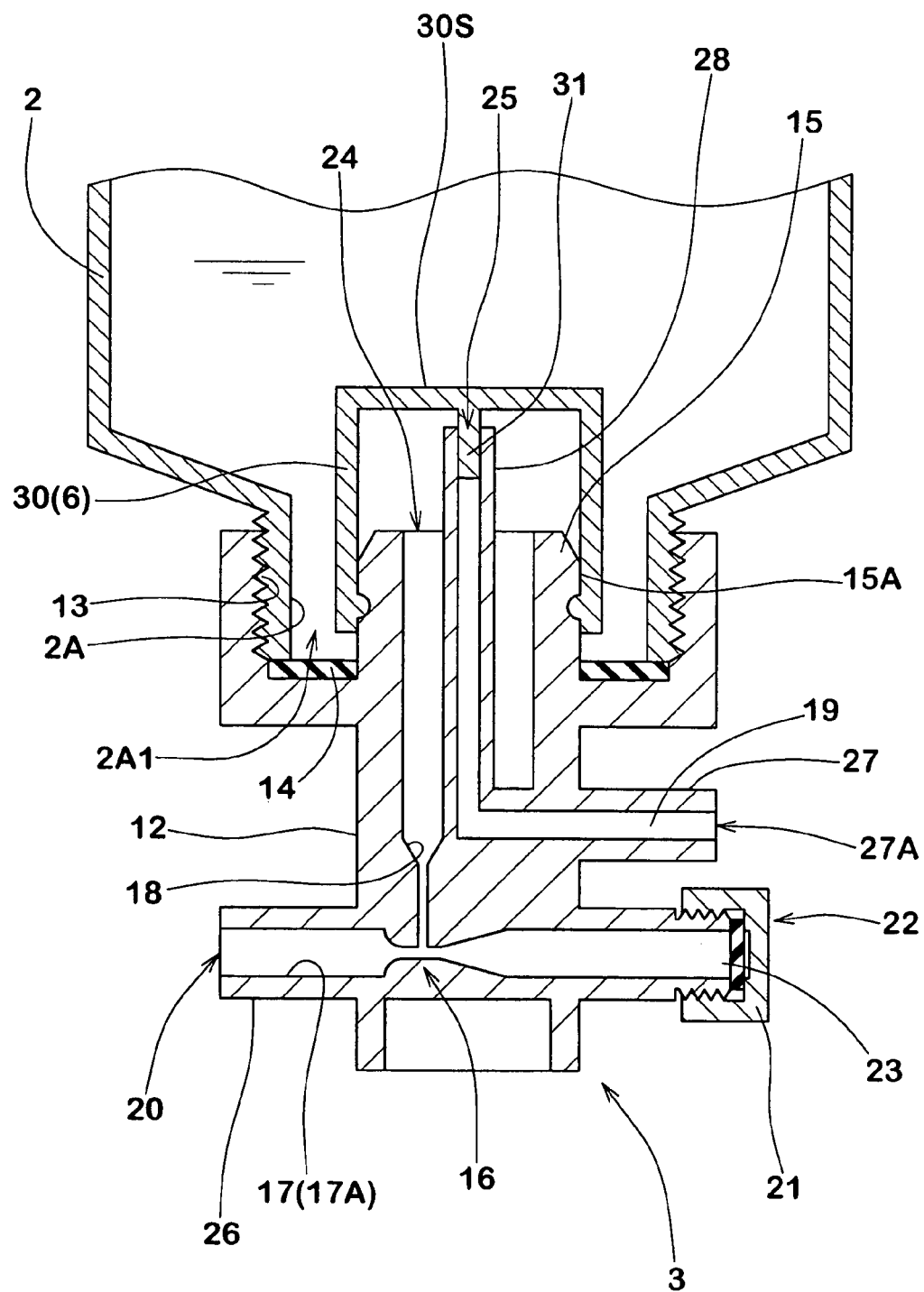
FIG. 2 is an enlarged sectional view of an essential portion of the puncture sealant supplying/removing apparatus.

FIG. 1 is a sectional view showing a case in which a supplying/removing apparatus of a puncture sealant of the present invention is used for repairing a puncture in a first-aid manner. FIG. 2 is an enlarged sectional view of an essential portion of FIG. 1.

As shown in FIG. 1, a puncture sealant supplying/removing apparatus 1 (apparatus 1, hereinafter) includes a pressure-resistant bottle 2 capable of accommodating a puncture sealant A, an apparatus body 3 capable of amounting the pressure-resistant bottle 2, a supply hose means 4A for supplying (or removing) the puncture sealant A in the pressure-resistant bottle 2 into a tire (T), and a high pressure air source 5.

The pressure-resistant bottle 2 is a bottle-like pressure-resistant container having pressure resistance of 800 kPa or higher. The pressure-resistant bottle 2 has a neck 2A, and a taking-out opening 2A1 through which a sealant is removed is formed in a tip end of the neck 2A.

As shown in FIG. 2, the apparatus body 3 includes a columnar barrel 12 and a mounting recess 13 which is integrally formed with the columnar barrel 12. The neck 2A of the pressure-resistant bottle 2 is inserted into the mounting recess 13 and is fixed therein. In this example, the columnar barrel 12 is a stepped columnar whose one end (upper end in FIG. 2) has a larger diameter. The mounting recess 13 is formed in the larger-diameter side end surface (upper end surface in FIG. 2). The mounting recess 13 is provided at its inner wall surface with an internal thread with which the neck 2A of the pressure-resistant bottle 2 is threadedly engaged. A packing material 14 is interposed between the neck 2A and a bottom surface of the mounting recess 13 so that the taking-out opening 2A1 is air-tightly closed.

In this example, the mounting recess 13 is formed with a columnar boss 15 rising from a bottom surface of the mounting recess 13 and extending into the pressure-resistant bottle 2. A later-described cap 6 is elastically fitted over an outer peripheral surface of the boss 15. That is, the outer peripheral surface of the boss 15 forms a cap mounting portion 15A. To make this fitting state between the cap 6 and the boss 15 more reliable, the outer peripheral surface of the boss 15 is provided with a groove-like or rib-like (groove-like in this example) retaining portion extending in the circumferential direction in this example.

The columnar barrel 12 is formed with a straight venturi flow-path 17 having a venturi portion 16, a first flow-path 18 extending from the venturi portion 16 into the pressure-resistant bottle 2, and a second flow-path 19 extending from the inside of the pressure-resistant bottle 2. One end of the supply hose means 4A is connected to the second flow-path 19.

More specifically, the venturi flow-path 17 is provided at its one end with an air intake 20 connected to the high pressure air source 5, and at its other end with an opening/closing tool 22. In this example, the opening/closing tool 22 is a lid 21. An air outlet 23 formed in the other end can be opened and closed freely by attaching and detaching the lid 21. In this example, the air intake 20 is formed as a connection opening of a hose connecting portion 26. One end of a supply hose means 4B of high pressure air extending from the high pressure air source 5 is connected to the hose connecting portion 26. Alternatively, the air intake 20 may be a connecting portion to which the high pressure air source 5 is directly connected without through the supply hose means 4B.

Figure 3:
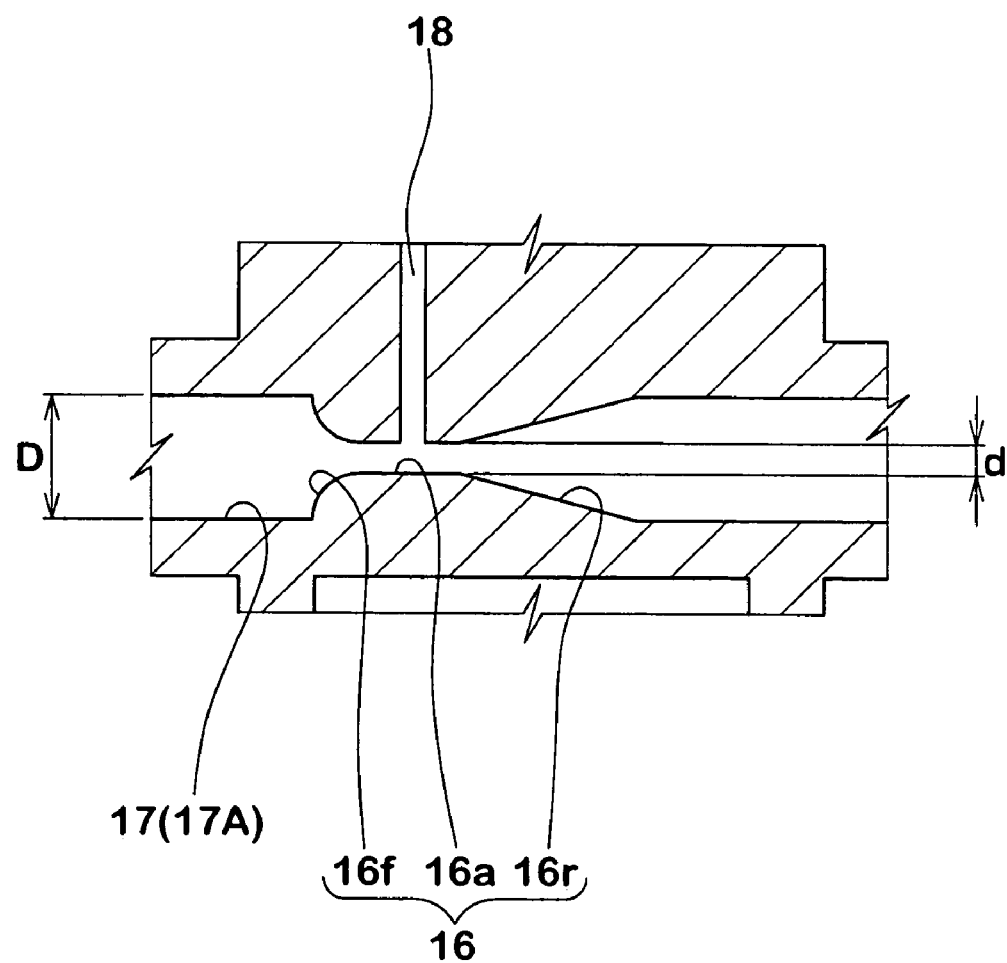
FIG. 3 is an enlarged sectional view of a venturi flow-path.

The venturi flow-path 17 has the venturi portion 16 whose diameter is reduced. The venturi portion 16 is located between the air intake 20 and the air outlet 23. As shown in FIG. 3 under magnification, the venturi portion 16 comprises a minimum diameter portion 16a whose flow-path diameter is minimum, and diameter-varied portions 16f and 16r which are respectively connected to front and rear portions of the venturi portion 16. The flow-path diameters of the diameter-varied portions 16f and 16r are varied substantially in a shape of cone. In this example, a ratio d/D between an opening diameter d of the venturi portion 16 which is an opening diameter at the minimum diameter portion 16a and an opening diameter D at a flow-path body 17A other than the venturi portion 16 is set in a range of 2 to 10. In this example, the flow-path body 17A has constant diameter, but the diameter may not be constant. In the latter case, the diameter of the flow-path body 17A at the air intake 20 is defined as the opening diameter D. To reduce the air turbulent flow at the venturi portion 16, the venturi flow-path 17 is formed such that a diameter variation in the diameter-varied portion 16r on the side of the air outlet 23 is more gentle than a diameter variation of the diameter-varied portion 16f on the side of the air intake 20. That is, a length of the diameter-varied portion 16r along the flow-path is set longer than a length of the diameter-varied portion 16f.

The first flow-path 18 extends upward from the minimum diameter portion 16a through the columnar barrel 12, and an air inflow opening 24 formed in the upper end of the first flow-path 18 opens at an upper end of the boss 15. The second flow-path 19 extends downward from a sealant outflow opening 25 which opens at the upper end of the boss 15. A lower end of the second flow-path 19 is in communication with a connection opening 27A of a hose connecting portion 27. One end of the supply hose means 4A is connected to the hose connecting portion 27.

The air inflow opening 24 and the sealant outflow opening 25 open at the upper end of the boss 15 which extends in the pressure-resistant bottle 2. With this structure, the first and second flow-paths 18 and 19 can be in communication with each other only in the pressure-resistant bottle 2.

In this example, the sealant outflow opening 25 is formed as a center opening of a tip end of a cylindrical portion 28 which rises from a central portion of the boss 15. The air inflow opening 24 is provided radially outward of the cylindrical portion 28 and radially inward of the cap mounting portion 15A. In this example, the air inflow opening 24 is formed as an annular opening surrounding the cylindrical portion 28 concentrically. The air inflow opening 24 may be a small opening such as a round hole which opens at a position different from the cylindrical portion 28.

The apparatus 1 of the present invention is mounted in a vehicle in a state in which the pressure-resistant bottle 2 is previously mounted on the apparatus body 3. When a puncture is to be repaired, only a piping operation between the apparatus 1 and the high pressure air source 5 using hose means 4A and a piping operation between the apparatus 1 and the tire (T) using the hose means 4A are carried out at a repairing site. Therefore, when the apparatus 1 is to be mounted on the vehicle, it is necessary to prevent the puncture sealant A in the pressure-resistant bottle 2 from flowing out into the first and second flow-paths 18 and 19. For this purpose, the cap 6 which air-tightly closes the air inflow opening 24 and the sealant outflow opening 25 is fitted over the boss 15.

The cap 6 is made of elastically deformable synthetic resin. The cap 6 includes a bottomed base portion 30 which is elastically fitted over the cap mounting portion 15A. The base portion 30 covers the boss 15, thereby closing the air inflow opening 24 and the sealant outflow opening 25. In this example, a projection-like plug 31 for closing the sealant outflow opening 25 projects from a bottom surface 30S of the base portion 30. The boss 15 is provided at its outer peripheral surface with the retaining portion. The base portion 30 is provided at its inner peripheral surface with an engaging portion which engages with the retaining portion to ensure the fitted state.

If such a cap 6 is provided, even when the apparatus 1 is mounted on the vehicle in the state in which the apparatus body 3 and the pressure-resistant bottle 2 are previously mounted, the puncture sealant A is not leaked and can be accommodated in the pressure-resistant bottle 2. Thus, in this example, the mounting operation between the pressure-resistant bottle 2 and the apparatus body 3 on the puncture repairing site becomes unnecessary, the working on the site can be simplified, and a trouble of overflowing or leakage of the puncture sealant A which may be caused at the time of the mounting operation can be eliminated.

Next, a using method of the apparatus 1 when a puncture is to be repaired will be explained.

First, on the puncture repairing site, as shown in FIG. 1, the high pressure air source 5 and the tire (T) are connected to the apparatus body 3 having the pressure-resistant bottle through the hose means 4A and 4B, respectively. Then, the high pressure air source 5 is operated.

At that time, the air outlet 23 of the venturi flow-path 17 is closed by the opening/closing tool 22. Thus, high pressure air from the high pressure air source 5 can flow into the cap 6 from the air inflow opening 24 through the supply hose means 4B, the air intake 20, the venturi portion 16 and the first flow-path 18. As a result, the internal pressure in the cap 6 is increased, and the cap 6 is lifted and is automatically detached from the boss 15. With this, the air inflow opening 24 and the sealant outflow opening 25 are released, and high pressure air flows into the pressure-resistant bottle 2. With this flowing high pressure air, the puncture sealant A in the pressure-resistant bottle 2 is supplied to the tire (T) through the sealant outflow opening 25, the second flow-path 19, the connection opening 27A and the supply hose means 4A. After the puncture sealant A is supplied, the high pressure air successively flows, and the tire (T) can automatically be pumped up.

Figure 4A:
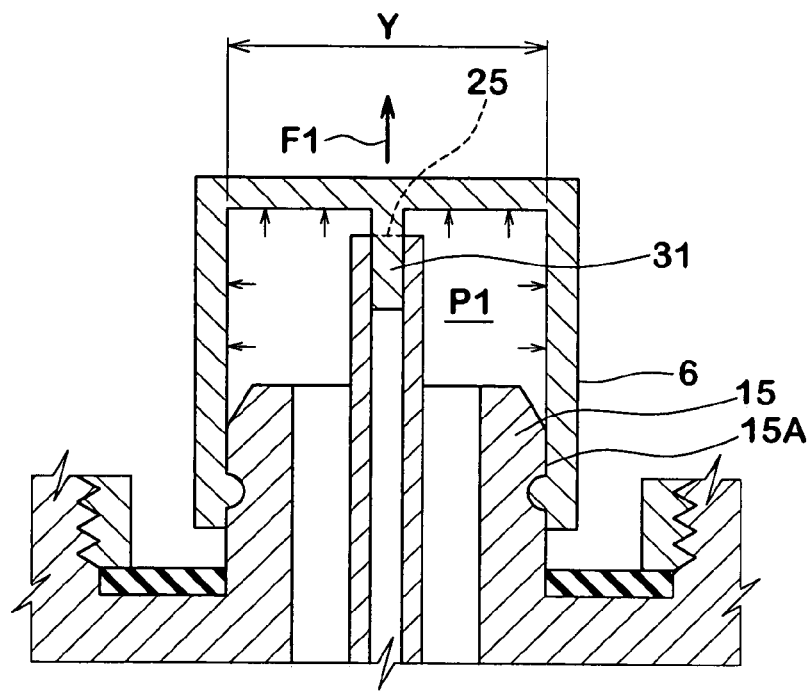
FIGS. 4(A) and 4(B) are sectional views used for explaining a lifting force applied to a cap.

Here, as shown in FIG. 4(A), the lifting force F1 to the cap 6 by the high pressure air can be obtained by the following equation (1). Thus, if the fitting force of the cap 6 is set smaller than the lifting force F1, the cap 6 can be detached from the boss 15.

$$F1 = P1 \times \pi (Y/2)^2 \quad (1)$$

Here, P1 represents high pressure air pressure, π represents the ratio of the circumference of a circle to its diameter, and Y represents a diameter of the cap mounting portion 15A. In this example, since relatively large diameter Y can be secured, the fitting force can also be set to a large value. Thus, it is possible to sufficiently enhance the sealing ability between the cap 6 and the boss 15, and to prevent liquid leakage of the puncture sealant A which may be caused due to temperature rise and vibration during the mounting operation on the vehicle.

Figure 4B:
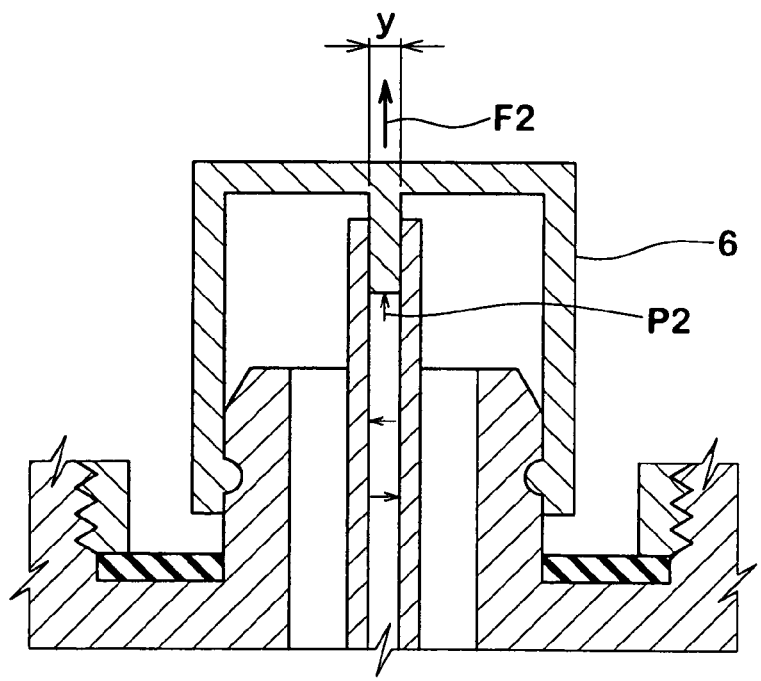

The cap 6 is provided with the plug 31 for closing the sealant outflow opening 25. When the puncture is to be repaired, if residue pressure P2 remains in the tire, a lifting force F2 (shown in FIG. 4(B)) is applied to the cap 6 due to the residue pressure P2 if the piping operation is carried out for the tire (T). The lifting force F2 is indicated with the following equation (2). The inner diameter Y of the sealant outflow opening 25 is smaller than the diameter Y of the cap mounting portion 15A. Therefore, it is possible to suppress the lifting force F2 to a value lower than the lifting force F1, and to prevent the cap 6 from being released by the residue pressure P2, and to prevent the puncture sealant A from reversely flowing to the high pressure air source 5.

$$F2 = P2 \times \pi (y/2)^2 \quad (2)$$

To reliably suppress this back flow, it is preferable that a ratio Y/y between the diameter Y and the inner diameter y is set to 2 or higher. The upper limit of the ratio Y/y is not especially limited, but it is preferable that the ratio Y/y is 30 or less because the opening diameter of the pressure-resistant bottle 2 is set to about 30 to 50 mm. Here, when the cap mounting portion 15A is noncircular, the diameter Y is defined by a diameter of a circle having the same area as that surrounded by the cap mounting portion 15A. That is, the cap mounting portion 15A is a square having sides L, the opening diameter D is defined as $L \times \sqrt{(4/\pi)}$. Similarly, when the sealant outflow opening 25 is noncircular, the inner diameter y is defined by a diameter of a circle having the same area as that of an opening area of the sealant outflow opening 25.

It is preferable that the fitting force of the cap 6 is set such that the cap 6 is detached when the internal pressure P1 falls in a range of 200 to 300 kPa. That is, it is preferable that the cap 6 is detached when the internal pressure P1 is equal to or less than 300 kPa but is not detached when the internal pressure P1 is less than 200 kPa. If the cap 6 is detached when the internal pressure P1 is less than 200 kPa, the sealing ability between the cap 6 and the boss 15 becomes insufficient, and the puncture sealant A may leak during the mounting operation of the apparatus on the vehicle. If the cap 6 is not detached when the internal pressure P1 is 300 kPa, it becomes necessary to enhance the pressure-resistant ability of constituent members of the pressure-resistant bottle 2, the apparatus body 3, the hose means 4A and 4B and the like more than necessary. This adversely increases the costs. When the pipe is connected to a tire which is used under high internal pressure such as a heavy duty tire, it is necessary to prevent the puncture sealant A from reversely flowing toward the high pressure air source 5. Thus, it is preferable that the cap 6 is fitted with such strength that the cap 6 is not detached with the residue pressure P2 smaller than 800 kPa.

It is preferable that the diameter Y of the cap mounting portion 15A is in a range of 10 to 40 mm. If the diameter Y is less than 10 mm, sufficiently large lifting force F1 can not be secured. Thus, it becomes necessary to set the fitting force of the cap 6 to a lower value, and the sealing ability between the cap 6 and the boss 15 is deteriorated. If the diameter Y exceeds 40 mm, the apparatus body 3 becomes large in size, and this causes waste of storage space.

It is preferable that the inner diameter y of the sealant outflow opening 25 is in a range of 0.5 to 5.0 mm. If the inner diameter y is less than 0.5 mm, the puncture sealant A is solidified at the sealant outflow opening 25 when the puncture sealant A is supplied, and the second flow-path 19 is clogged. If the inner diameter y exceeds 5.0 mm, the lifting force F2 generated by the residue pressure P2 becomes great. That is, the cap 6 is prone to be detached, and there is an adverse possibility that the puncture sealant A reversely flows. From this point of view, it is preferable that the diameter Y is in the range of 20 to 30 mm, and the inner diameter y is in the range of 1 to 3 mm.

Next, a using method of the apparatus 1 when the puncture sealant A in the tire is removed on a tire repairing place will be explained.

Figure 5:
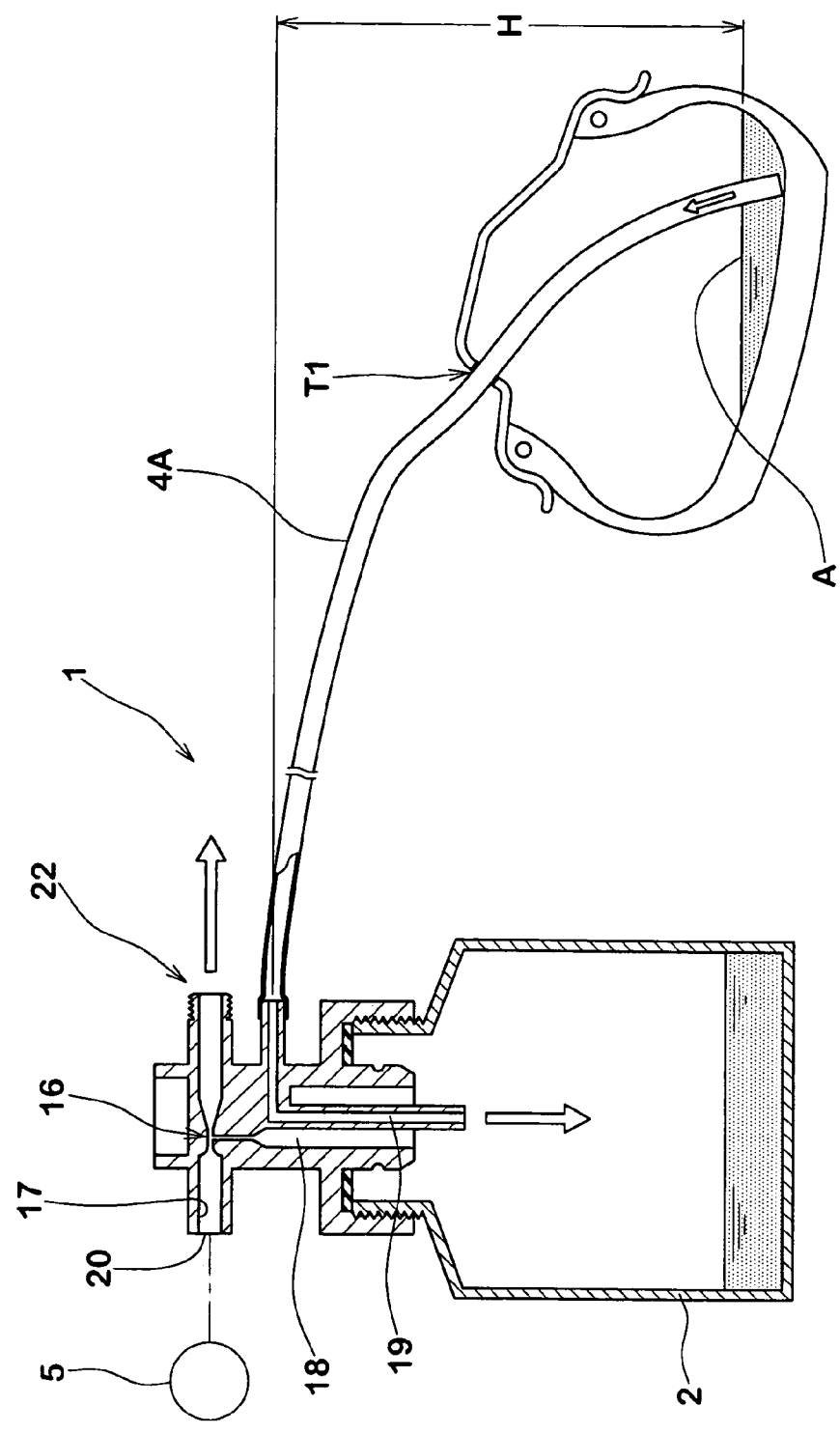
FIG. 5 is a sectional view of one example of a state in which the puncture sealant supplying/removing apparatus of the invention is used for removing a puncture sealant in a tire.
Figure 6A:
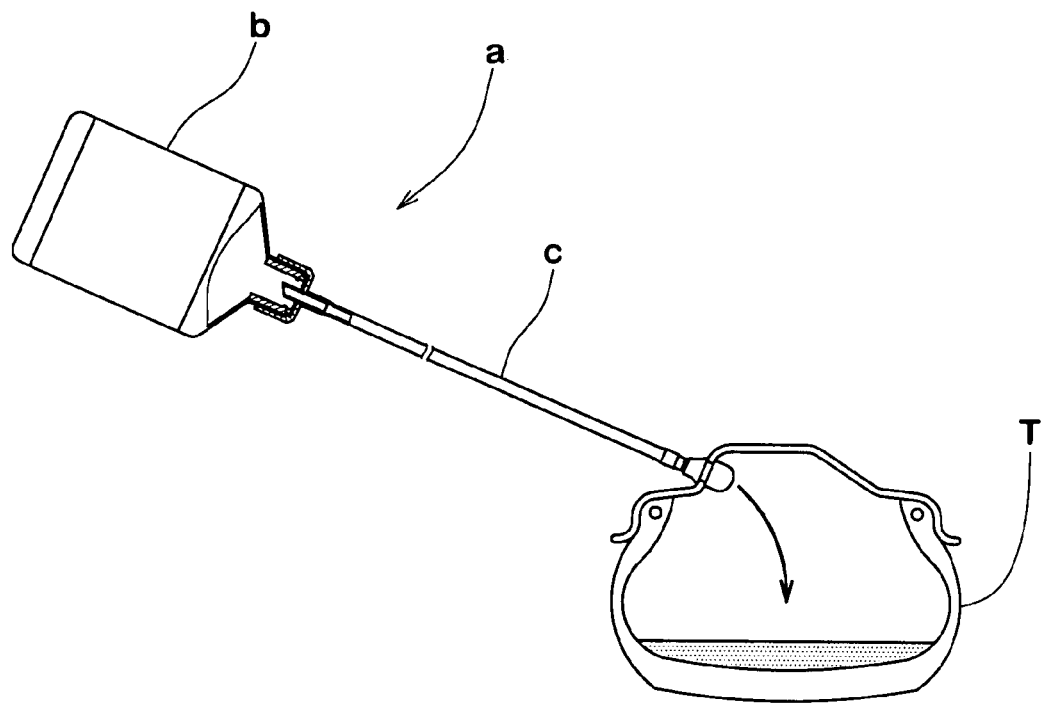
FIGS. 6(A) and 6(B) are sectional views for explaining one example of conventional technique.
Figure 6B:
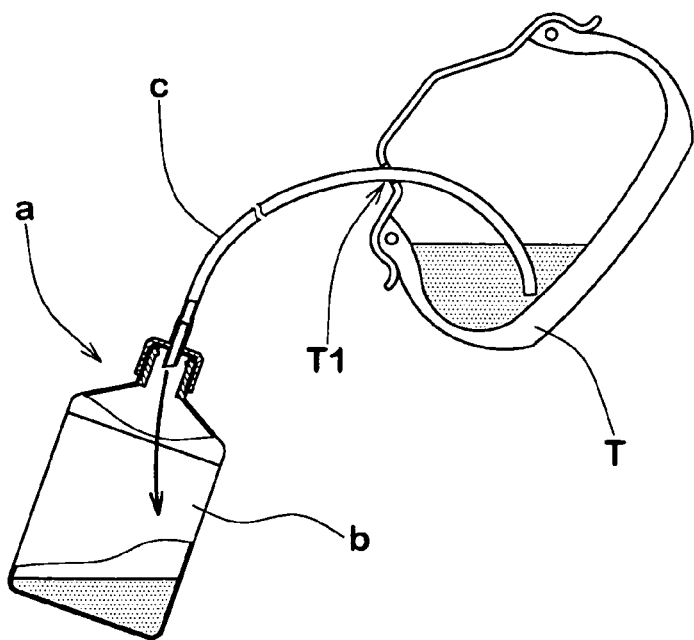

As shown in FIG. 5, the same piping operation as that when the puncture is repaired is carried out for the apparatus 1, the pressure-resistant bottle 2 is vertically reversed, the lid 21 is removed, and the air outlet 23 of the venturi flow-path is opened. The air valve of the tire (T) is removed to expose the valve mounting hole (T1). Then, the other end of the supply hose means 4A is inserted from the valve mounting hole (T1).

In this state, the high pressure air source 5 is operated. The high pressure air is discharged from air outlet 23 from the air intake 20 through the venturi flow-path 17. At that time, since the flowing speed becomes high at the venturi portion 16, a negative pressure is generated. As a result, the negative pressure is applied to the first flow-path 18, the pressure-resistant bottle 2, the second flow-path 19 and the supply hose means 4A which are in communication with the venturi portion 16, and the puncture sealant A in the tire (T) can be sucked and removed from the other end of the supply hose means 4A. The sucked puncture sealant A can automatically be collected in the pressure-resistant bottle 2.

Here, when the puncture sealant A is to be removed, it is preferable that the puncture sealant A having specific gravity of about 1.0 can be sucked up to the height H of 50 cm or higher in terms of operability. For this purpose, it is necessary to employ the high pressure air source 5 having a flow rate of 13.3 liters/minute or more when the opening diameter ratio D/d of the venturi portion 16 is 3.0 for example.

If the opening diameter ratio D/d is smaller than 2.0, a large high pressure air source 5 having large flow rate and high output is required to secure necessary sucking force, and this is disadvantageous in terms of economy, weight, and mounting space. If the opening diameter ratio D/d is set greater, since the flow rate can be small and thus, it is possible to employ a small and light high pressure air source 5 having low output. If the opening diameter ratio D/d exceeds 10, it becomes necessary to set the opening diameter d of the venturi portion 16 to a diameter smaller than 0.5 mm, and there is an adverse possibility that the venturi portion 16 is clogged. Thus, it is preferable that the opening diameter ratio D/d is in the range of 2 to 10, and more preferably, its lower limit value is set to 2.5 or higher, and the upper limit value is set to 8.0 or lower.

The opening diameters d and D are defined by a diameter of a circle having the same area as that of the opening area when their cross section is noncircular.

Although especially preferable embodiment of the present invention has been described in detail, the present invention is not limited to the embodiment, and the invention can be variously be modified and carried out.

What is claimed is:

1. A puncture sealant supplying/removing apparatus of a tire capable of charging a puncture sealant into a punctured tire, and removing a puncture sealant charged in a tire, comprising a pressure-resistant bottle capable of accommodating the puncture sealant, an apparatus body capable of mounting the pressure-resistant bottle, supply hose means which supplies the puncture sealant accommodated in the pressure-resistant bottle to the tire or which returns the puncture sealant in the tire into the pressure-resistant bottle, and a high pressure air source, wherein
the apparatus body comprises
a venturi flow-path having a venturi portion whose flow-path diameter is reduced,
a first flow-path extending from the venturi portion into the pressure-resistant bottle mounted on the apparatus body, and
a second flow-path extending from an inside of the pressure-resistant bottle, the second flow-path being in communication with the first flow-path in the pressure-resistant bottle and one end of the supply hose means being connected to the second flow-path,
the venturi flow-path is provided at its one end with an air intake which can be connected to the high pressure air source, the venturi flow-path is provided at its other end with an opening/closing tool capable of opening and closing the other end.

2. The puncture sealant supplying/removing apparatus of the tire according to claim 1, wherein
in a state in which the other end of the venturi flow-path is closed by the opening/closing tool, the high pressure air supplied from the air intake is sent to the pressure-resistant bottle from the venturi portion through the first flow-path, the puncture sealant in the pressure-resistant bottle is supplied to the tire through the second flow-path and the supply hose means, and in a state in which the other end of the venturi flow-path is opened by the opening/closing tool, the high pressure air supplied from the air intake is discharged from the other end of the venturi flow-path through the venturi portion, a negative pressure generated in the venturi portion at that time is applied to the first flow-path, the pressure-resistant bottle, the second flow-path and the supply hose means to extract the puncture sealant in the tire.

3. The puncture sealant supplying/removing apparatus of the tire according to claim 2, wherein
when the puncture sealant in the tire is extracted, the pressure-resistant bottle is vertically reversed.

4. The puncture sealant supplying/removing apparatus of the tire according to any one of claims 1 to 3, wherein
an opening diameter ratio D/d between an opening diameter D of the venturi flow-path and an opening diameter ratio d of the venturi portion is 2 to 10.

5. The puncture sealant supplying/removing apparatus of the tire according to any one of claims 1 to 3, wherein
the venturi portion comprises a minimum diameter portion whose opening diameter is minimum, and front and rear diameter-varied portions which are respectively connected to front and rear portions of the minimum diameter portion and whose flow-path diameters are varied in a shape of a cone, a length along a flow-path of the rear diameter-varied portion is longer than a length of the front diameter-varied portion.

6. The puncture sealant supplying/removing apparatus of the tire according to any one of claims 1 to 3, wherein an opening diameter d of the venturi portion is 0.5 mm or greater.

7. The puncture sealant supplying/removing apparatus of the tire according to any one of claims 1 to 3, wherein
the apparatus body comprises a mounting recess for fixing a neck of the pressure-resistant bottle, and a boss rising from a bottom surface of the mounting recess and extending into the neck, an air intake in one end of the first flow-path and a sealant outflow opening in one end of the second flow-path are opened at an upper surface of the boss.

8. The puncture sealant supplying/removing apparatus of the tire according to claim 7, wherein
the apparatus body comprises a cap having a bottomed base portion which is fitted to an outer peripheral surface of the boss and which covers the air intake and the sealant outflow opening.

9. The puncture sealant supplying/removing apparatus of the tire according to claim 8, wherein
the cap includes a plug which projects from the bottom surface of the base portion and which closes the sealant outflow opening with a sealing effect.

10. The puncture sealant supplying/removing apparatus of the tire according to claim 9, wherein
a ratio Y/y of a diameter Y of the boss and a diameter y of the sealant outflow opening is 2 or greater.

11. The puncture sealant supplying/removing apparatus of the tire according to claim 9, wherein
the cap is fitted to the boss with such a strength that the cap is detached from the boss when a pressure in the first flow-path is in a range of 200 to 300 kPa, and the cap is not detached from the boss when a pressure in the second flow-path applied to the plug is less than 800 kPa.

* * * * *